US009982174B2

(12) United States Patent
Berlin

(10) Patent No.: US 9,982,174 B2
(45) Date of Patent: May 29, 2018

(54) BINDER COMPOSITIONS COMPRISING LIGNIN DERIVATIVES

(71) Applicant: Fibria Innovations Inc., Burnaby (CA)

(72) Inventor: Alex Berlin, Burnaby (CA)

(73) Assignee: Fibria Innovations Inc., Burnaby (CA)

( * ) Notice: Subject to any disclaimer, the term of this patent is extended or adjusted under 35 U.S.C. 154(b) by 0 days. days.

(21) Appl. No.: 15/336,526

(22) Filed: Oct. 27, 2016

(65) Prior Publication Data

US 2017/0044409 A1 Feb. 16, 2017

Related U.S. Application Data

(60) Division of application No. 14/798,396, filed on Jul. 13, 2015, now Pat. No. 9,505,964, which is a continuation of application No. 13/584,651, filed on Aug. 13, 2012, now abandoned, which is a continuation of application No. PCT/CA2011/000182, filed on Feb. 15, 2011.

(60) Provisional application No. 61/304,745, filed on Feb. 15, 2010, provisional application No. 61/304,742, filed on Feb. 15, 2010.

(30) Foreign Application Priority Data

May 27, 2010 (WO) ................ PCT/CA2010/000800

(51) Int. Cl.
| | |
|---|---|
| C09J 175/04 | (2006.01) |
| D21J 1/04 | (2006.01) |
| C08L 97/00 | (2006.01) |
| C09J 161/06 | (2006.01) |
| C09J 197/00 | (2006.01) |
| B29C 70/12 | (2006.01) |
| B29C 70/34 | (2006.01) |
| C08G 18/40 | (2006.01) |
| C08G 18/76 | (2006.01) |
| B29K 75/00 | (2006.01) |
| B29K 105/12 | (2006.01) |
| B29K 311/14 | (2006.01) |

(52) U.S. Cl.
CPC ............ C09J 175/04 (2013.01); B29C 70/12 (2013.01); B29C 70/34 (2013.01); C08G 18/4081 (2013.01); C08G 18/7671 (2013.01); C08L 97/00 (2013.01); C09J 161/06 (2013.01); C09J 197/005 (2013.01); D21J 1/04 (2013.01); B29K 2075/00 (2013.01); B29K 2105/12 (2013.01); B29K 2311/14 (2013.01)

(58) Field of Classification Search
CPC ........ C09J 175/04; B29C 70/12; B29C 70/34; C08G 18/4081; D21J 1/04; C08L 97/00; C08J 161/06
See application file for complete search history.

(56) References Cited

U.S. PATENT DOCUMENTS

| | | |
|---|---|---|
| 1,358,164 A | 11/1920 | Kottinger |
| 2,934,531 A | 4/1960 | Gordon et al. |
| 2,977,352 A | 3/1961 | Gardon et al. |
| 3,461,082 A | 8/1969 | Otani et al. |
| 3,546,199 A | 12/1970 | Christian et al. |
| 3,585,104 A | 6/1971 | Kleinert |
| 4,100,016 A | 7/1978 | Diebold et al. |
| 4,279,788 A | 7/1981 | Lambuth |
| 4,326,036 A | 4/1982 | Hayes |
| 4,409,032 A | 10/1983 | Paszner et al. |
| 4,470,851 A | 9/1984 | Paszner et al. |
| 4,486,557 A | 12/1984 | Gaul et al. |
| 4,594,130 A | 6/1986 | Chang |
| 4,764,596 A | 8/1988 | Lora et al. |
| 4,918,167 A | 4/1990 | Glasser et al. |
| 4,964,596 A | 10/1990 | Ganssle et al. |
| 4,968,771 A | 11/1990 | Baxter |
| 5,173,527 A | 12/1992 | Calve |
| 5,196,460 A | 3/1993 | Lora et al. |
| 5,202,403 A | 4/1993 | Doering |
| 5,223,601 A | 6/1993 | Chum et al. |
| 5,344,921 A | 9/1994 | Sudo et al. |
| 5,373,070 A | 12/1994 | Gardzielia et al. |
| 5,382,608 A | 1/1995 | Gardzielia et al. |
| 5,411,594 A | 5/1995 | Brelsford |
| 5,424,417 A | 6/1995 | Torget et al. |
| 5,681,427 A | 10/1997 | Lora et al. |

(Continued)

FOREIGN PATENT DOCUMENTS

| | | |
|---|---|---|
| CA | 1136326 A1 | 11/1982 |
| CA | 1201115 A | 2/1986 |

(Continued)

OTHER PUBLICATIONS

Akim et al.: "$^{13}$C NMR of Lignins in Aqueous Alkali", Holzforschung, 51 (1997) 419-427.
Alfani F et al: "Comparison of SHF and SSF processes for the bioconversion of steam-exploded wheat straw", Journal of Industrial Microbiology and Biotechnology, vol. 25, No. 4, Oct. 2000 (Oct. 2000), pp. 184-192, XP002676900.
Arato C. et al. The Lignol approach to biorefining of woody biomass to produce ethanol and chemicals. Applied Biochemistry and Biotechnology—Part A Enzyme Engineering and Biotechnology Mar. 2005 (Mar. 2005), vol. 123 (1-3), pp. 871-882, ISSN: 0273-2289.
Argyropoulos, DS et al. "Isolation of Residual Kraft Lignin in High Yield and Purity" Journal of Pulp and Paper Science 2002, 28, 2, 50-54.

(Continued)

Primary Examiner — John E Uselding
(74) Attorney, Agent, or Firm — Perkins Coie LLP; Viola T. Kung

(57) ABSTRACT

The present disclosure provides an adhesive composition comprising derivatives of native lignin and an isocyanate-based binder such as methylene diphenyl diisocyanate. The present compositions may further comprise formaldehyde-based resins such as PF, UF, and MF. While not wishing to be bound by theory, it is believed that incorporating derivatives of native lignin in isocyanate compositions will reduce incidence of pre-curing.

15 Claims, No Drawings

(56) References Cited

U.S. PATENT DOCUMENTS

| | | |
|---|---|---|
| 5,730,837 A | 3/1998 | Black et al. |
| 5,756,098 A | 5/1998 | Price et al. |
| 5,788,812 A | 8/1998 | Agar et al. |
| 5,879,463 A | 3/1999 | Proenca |
| 5,911,276 A | 6/1999 | Kieke |
| 5,916,780 A | 6/1999 | Foody et al. |
| 6,022,419 A | 2/2000 | Torget et al. |
| 6,039,276 A | 3/2000 | Hatt et al. |
| 6,172,204 B1 | 1/2001 | Sarkanen et al. |
| 6,179,958 B1 | 1/2001 | Lysen et al. |
| 6,228,177 B1 | 5/2001 | Torget |
| 6,258,175 B1 | 7/2001 | Lightner |
| 6,281,328 B1 | 8/2001 | Sartori et al. |
| 6,342,378 B1 | 1/2002 | Zhang et al. |
| 6,464,827 B1 | 10/2002 | Colodette |
| 6,555,350 B2 | 4/2003 | Ahring et al. |
| 6,632,286 B2 | 10/2003 | Converse |
| 7,189,306 B2 | 3/2007 | Gervais |
| 7,413,662 B2 | 8/2008 | Eriksen et al. |
| 7,413,882 B2 | 8/2008 | Berka et al. |
| 7,465,791 B1 | 12/2008 | Hallberg et al. |
| 7,649,086 B2 | 1/2010 | Belanger et al. |
| 7,947,182 B2 | 5/2011 | Gong |
| 7,959,765 B2 | 6/2011 | Argyropoulos |
| 8,067,193 B2 | 11/2011 | Hughes et al. |
| 8,193,324 B2 | 6/2012 | Hallberg et al. |
| 8,227,004 B2 | 7/2012 | Hallberg et al. |
| 8,288,460 B2 | 10/2012 | Balakshin et al. |
| 8,378,020 B1 | 2/2013 | Balakshin et al. |
| 8,399,688 B2 | 3/2013 | Dumesic et al. |
| 8,426,502 B2 | 4/2013 | Balakshin et al. |
| 8,431,635 B2 | 4/2013 | Balakshin et al. |
| 8,445,562 B2 | 5/2013 | Balakshin et al. |
| 2002/0069987 A1 | 6/2002 | Pye |
| 2002/0143085 A1 | 10/2002 | Yoshida et al. |
| 2003/0070995 A1 | 4/2003 | Breitenbeck |
| 2005/0234156 A1 | 10/2005 | Thames et al. |
| 2006/0264519 A1 | 11/2006 | Eckert et al. |
| 2007/0034345 A1 | 2/2007 | Petrus et al. |
| 2007/0141691 A1 | 6/2007 | Hiri |
| 2007/0172913 A1 | 7/2007 | Hughes et al. |
| 2007/0259412 A1 | 11/2007 | Belanger |
| 2008/0021155 A1 | 1/2008 | Bono et al. |
| 2008/0115415 A1 | 5/2008 | Agrawal et al. |
| 2008/0262182 A1 | 10/2008 | Funaoka |
| 2008/0295980 A1 | 12/2008 | Hallberg et al. |
| 2008/0299629 A1 | 12/2008 | Hallberg et al. |
| 2008/0317661 A1 | 12/2008 | Eckert et al. |
| 2009/0062516 A1 | 3/2009 | Belanger et al. |
| 2009/0062581 A1 | 3/2009 | Appel et al. |
| 2009/0069550 A1 | 3/2009 | Belanger et al. |
| 2009/0117226 A1 | 5/2009 | Hallberg et al. |
| 2009/0118477 A1 | 5/2009 | Hallberg et al. |
| 2010/0051558 A1 | 3/2010 | Gong |
| 2010/0071829 A1* | 3/2010 | Tanzer ............... B27N 3/002 156/62.2 |
| 2010/0159517 A1 | 6/2010 | Diner et al. |
| 2010/0305242 A1 | 12/2010 | Balakshin et al. |
| 2010/0305243 A1 | 12/2010 | Balakshin et al. |
| 2010/0305244 A1 | 12/2010 | Balakshin et al. |
| 2010/0311943 A1 | 12/2010 | Lallave Rivas et al. |
| 2011/0091711 A1 | 4/2011 | Neivandt et al. |
| 2011/0236946 A1 | 9/2011 | Maclachlan et al. |
| 2011/0252701 A1 | 10/2011 | Soane et al. |
| 2012/0136097 A1 | 5/2012 | Berlin |
| 2012/0237980 A1 | 9/2012 | Hallberg et al. |
| 2012/0247617 A1 | 10/2012 | Berlin et al. |
| 2013/0168323 A1 | 7/2013 | Soane et al. |
| 2013/0204039 A1 | 8/2013 | Runge |
| 2013/0228298 A1 | 9/2013 | Balakshin et al. |
| 2014/0346395 A1 | 11/2014 | Balakshin et al. |
| 2015/0315439 A1 | 11/2015 | Berlin |

FOREIGN PATENT DOCUMENTS

| | | |
|---|---|---|
| CA | 1230592 A | 12/1987 |
| CA | 1278294 C | 12/1990 |
| CA | 2043399 C | 11/1991 |
| CA | 2214013 A1 | 7/1997 |
| CA | 1339664 C | 2/1998 |
| CA | 2419658 A1 | 3/2002 |
| CA | 2611152 A1 | 12/2006 |
| CA | 2661202 A1 | 3/2008 |
| CA | 2676982 A1 | 8/2008 |
| CA | 2597135 C | 9/2008 |
| CA | 2687916 A1 | 12/2008 |
| CA | 2696268 A1 | 2/2009 |
| CA | 2697469 A1 | 3/2009 |
| CA | 2743052 A1 | 6/2010 |
| CA | 2715458 A1 | 10/2010 |
| CA | 2798268 C | 8/2011 |
| CA | 2803177 A1 | 1/2012 |
| CN | 1766000 A | 5/2006 |
| DE | 199 52 563 A1 | 5/2001 |
| DE | 20 2008 001 703 U1 | 5/2008 |
| EP | 0038677 B1 | 7/1984 |
| EP | 0224721 A1 | 6/1987 |
| EP | 0105937 B1 | 11/1987 |
| EP | 0461463 A2 | 12/1991 |
| EP | 0485150 A1 | 5/1992 |
| EP | 0737253 A1 | 10/1996 |
| GB | 2439135 A | 12/2007 |
| JP | 2007284337 A | 11/2007 |
| JP | 2008005832 A | 1/2008 |
| SE | 527646 C2 | 5/2006 |
| WO | 199315261 A1 | 8/1993 |
| WO | 200075153 A1 | 12/2000 |
| WO | 2007129921 A1 | 11/2007 |
| WO | 2008008793 A1 | 1/2008 |
| WO | 2008137639 A1 | 11/2008 |
| WO | 2008144878 A1 | 12/2008 |
| WO | 2008144903 A1 | 12/2008 |
| WO | 2009/003292 A1 | 1/2009 |
| WO | 2009/028969 A1 | 3/2009 |
| WO | 2010060183 A1 | 6/2010 |
| WO | 2010081231 A1 | 7/2010 |
| WO | 2010135804 A1 | 12/2010 |
| WO | 2010135805 A1 | 12/2010 |
| WO | 2010135806 A1 | 12/2010 |
| WO | 2010135807 A1 | 12/2010 |
| WO | 2010135832 A1 | 12/2010 |
| WO | 2010135833 A1 | 12/2010 |
| WO | 2011026243 A1 | 3/2011 |
| WO | 2011097719 A1 | 8/2011 |
| WO | 2011097720 A1 | 8/2011 |
| WO | 2011097721 A1 | 8/2011 |
| WO | 2011106879 A1 | 9/2011 |
| WO | 2011/150504 A1 | 12/2011 |
| WO | 2012000093 A1 | 1/2012 |
| WO | 2012031356 A1 | 3/2012 |
| WO | 2012037668 A1 | 3/2012 |
| WO | 2012126099 A1 | 9/2012 |
| WO | 2012129652 A1 | 10/2012 |
| WO | 2014094104 A1 | 6/2014 |

OTHER PUBLICATIONS

Arlt Jr., HG et al., "Lignin Structure. VIII. Characterization of Ethanol Spruce Lignin Prepared by a New Method"; J. Am. Chem. Soc.; vol. 78, No. 9, pp. 1904-1906 (1956).

Asgari, F et al. "Fundamentals of oxygen delignification. Part II. Functional group for-mation/elimination in residual kraft lignin" Can. J. Chem. 1998, 76, 1606-1615.

Baugh et al. "Thermochemical Pretreatment of Lignocellulose to Enhance Methane Fermentation: II. Evaluation and Application of Pretreatment Model", Biotechnology and Bioengineering, vol. 31, pp. 62-70, 1988.

Brosse, N et al. "Dilute Sulphuric acid and ethanol Organosolv Pretreatment of Miscanthus x Gigan-teus" Celluose Chemistry and Technology 2010, 44, 71-78.

(56) References Cited

OTHER PUBLICATIONS

Brosse, N et al. "Pretreatment of Miscanthus x giganteus Using the Ethanol Organolsolv Process for Ethanol Production". hid. Eng. Chem. Res. 2009, 8328-8334.
Catignani, GL et al. "Antioxidant Properties of Lignin" Journal of Food Science 1982, 1745 and 1748.
Chakar, F.S. et al., "Biobleaching chemistry of laccase-mediator systems on high-lignin-content kraft pulps," Can. J. Chem. 2004, 82, pp. 344-352.
Chakar, FS et al. "Laccase-Lignin Reactions" IPST Technical Paper Series No. 876, Institute of Paper Science and Technology Aug. 2000.
Chandel, et al. "Bioconversion of pentose sugars into ethanol: A review and future directions"Biotechnology and Molecular Biology Review vol. 6(1), pp. 008-020, Jan. 2011.
Colodette et al. "Influence of pulping conditions on eucalyptus kraft pulp yield, quality and bleachability". Tappi Journal 2002, (1), 14-20.
Crestini et al.: "Structural Analysis of Wheat Straw Lignin by Quantitative 31 P and 2D NMR Spectroscopy. The Occurrence of Ester Bonds and a-O-4 Substructures". J. Agric. Food. Chem. 1997, 45, 1212-1219.
Datar, Rohit, et al. "Hydrogen Production from the Fermentation of Corn Stover Biomass Pretreated with a SteamExplosion Process," International Journal of Hydrogen Energy, vol. 32, Nov. 13, 2006, pp. 932-939, XP022094535.
Dizhbite, T. et al., "Characterization of the radical scavenging activity of lignins—natural antioxidants," Bioresource Technology 2004, 95, pp. 309-317.
Dominguez, et al.; "Thermal Stability and Pyrolysis Kinetics of Organosolv Lignins Obtained from Eucalyptus Globulus"; Industrial Crops and Products; vol. 27, No. 2, pp. 150-156 (Dec. 21, 2007).
Dr. W. Smith, "Mapping the Development of UK Biorefinery Complexes (NFC07/008)" A Report Prepared for , Tamutech Consultancy, May 2007, 80 pages.
El Hage, R et al. "Characterization of milled wood lignin and ethanol organosolv lignin from miscan-thus". Polymer Degradation and Stability 2009, 94, 1632-1638.
El Hage, R et al. "Effect of the Pre-Treatment Severity on the Antioxidant Properties of Ethanol Organosolv Miscanthus x giganteus Lignin". Natural Resources 2012 (on-line Jun. 2012), 3, 29-34.
El Hage, R et al. "Effects of process severity on the chemical structure of Miscanthus Ethanol organosolv lignin". Polymer Degradation and Stability 2010, 95, 997-1003.
Enoki, A. et al. "Degredation of the Lignin Model Compounds 4-Ethoxy-3methoxyphenylglycol 3-Guaiacyl and Vanillic Acid Ethers by Phanerochaete Chrysosporium", FEMS Microbiology Letters 10, 1981, p. 373.
Froass, P.M. et al., "Nuclear Magnetic Resonance Studies. 4. Analysis of Residual Lignin after Kraft Pulping," Ind. Eng. Chem. Res. 1998, 37, pp. 3388-3394.
Gellerstedt. G. et al., "Chemical Structures Present in Biofuel Obtained from Lignin," Energy & Fuels 2008, 22, pp. 4240-4244.
Ghatak et al: "Spectroscopic comparison of lignin separated by electrolysis and acid precipitation of wheat straw soda black liquor", Industrial Crops and Products, Elsevier, NL, vol. 28, No. 2, Sep. 1, 2008 (Sep. 1, 2008), pp. 206-212, XP023178276.
Girisuta B. et al. A Kinetic Study on the Conversion of Glucose to Levulinic Acid. Icheme Part A 84(A5)339-349, May 2006.
Girisuta B. Levulinic Acid from Lignocellulosic Biomass. Dissertation Aug. 15, 1975, University of Groningen.
Gosselink et al.: "Analytical protocols for characterization of sulphur-free lignin". Industrial crops and Products 2004, 19, 271-281.
Gosselink, RJA. "Lignin as a reneweable aromatic resource for the chemical industry" Thesis Ibr the degree of doctor at Wageningen University. Dec. 2011, 1-191.

Gregorova, A. et al. "Radical Scavenging Capacity of Lignin and Its Effect on Processing Stabilization of Virgin and Recycled Polypropylene", Journal of Applied Polymer Science, 2007, vol. 106, Issue 3, pp. 1626-1631.
Gregorova, A. et al., "Stabilization effect of lignin in polypropylene and recycled polypropylene," Polymer Degradation and Stability 2005, 89, pp. 553-558.
Hahn-Hagerdal et al., "Ethanolic Fermentation of Pentoses in Lignocellulose Hydrolysates, Applied Biochemistry and Biotechnology", vol. 28/29, 1991, 131-144.
Hu, Get al. "Structural Characterization of Switchgrass Lignin atter Ethanol Organosolv Pre-treatment". Energy Fuels 2012 (published Dec. 22, 2011) 26, 740-745.
Hussein, et al; "Oil Spill Sorption using Carbonized Pith Bagasse: Trial for Practical Application"; Int. J. Environ. Tech.; vol. 5, No. 2, pp. 233-242 (Mar. 10, 2008).
Jaaskelainen et al. "The effect of isolation method on the chemical structure of residual lignin". Wood Sci Techno 2003, 37, 91-102.
Jahan, MS et al. "Isolation and Characterization of Lignin from Tropical and Temperate Hardwood" Bangladesh J. Sci. Ind. Res. 2009, 44(3), 271-280.
Jeffries, "Comparison of Alternatives for the Fermentation of Pentoses to Ethanol by Yeasts" In: Lowenstein, M ichael Z., ed. Energy applications of biomass: Proceedings of the National Meeting on Biomass R & D for Energy Applications; Oct. 1-3, 1984; Arlington, VA. New York, NY: Elsevier Applied Science Publishers; 1985 : 231-252.
Kadla, J. F., et al., "Lignin-based carbon fibers for composite fiber applications," Carbon, 2002, 40, 2913-2920.
Kasprzycka-Guttman, T., et al., "Antioxidant properties of lignin and its fractions," Thermochimica Acta 1994, 231, pp. 161-168.
Katzen, R., "Extraction of Lignin from Hydrolyzed Lignocellulose," Ind. Engg. Chem., Dec. 1945, pp. 1218-1222.
Keating Jeffrey D et al: "Tolerance and adaptation of ethanologenic yeasts to lignocellulosic inhibitory compounds", Biotechnology and Bioengineering, vol. 93, No. 6, Apr. 2006 (Apr. 2006), pp. 1196-1206, XP002676901, ISSN: 0006-3592.
Keating, J. D., et al. "An Ethanologenic Yeast Exhibiting Unusual Metabolism in the Fermentation of Lignocellulosic Hexose Sugars", Journal of Industrial Microbiology and Biotechnology, 2004, 31, 235-244.
Kim et al. "Simultaneous consumption of pentose and hexose sugars: an optimal microbial phenotype for efficient fermentation of lignocellulosic biomass" Appl Microbiol Biotechnol (2010) 88:1077-1085.
Kim et al.; "Preliminary Study on Converting Hybrid Poplar to High-Value Chemicals and Lignin Using Organosolv Ethanol Process", Ind. Eng. Chem. Res., Oct. 26, 2010, vol. 49, pp. 12156-12163.
Knutsen, J. and Davis, R.: "Cellulase retention and sugar removal by membrane ul-trafiltration during lignocellulosic biomass hydrolysis", Applied Biochemistry and Biotechnology, 2004, vol. 113-116, pp. 585-599, ISSN: 0273-2289.
Kosa et al. "Characterization of LignoBoost lignin to predict possible utilization". Presentation, Jul. 17, 2009 http//Avww.ipst. gatech.edu/faculty new/facultybios/ragauskas/student presentations/Kosa%20Lignin-SCO.pdf.
Kosikova, B. et al., "Lignin-Stimuiated Protection of Polypropylene Films and DNA in Cells of Mice against Oxidation Damage," BioResources May 2009, 4(2), pp. 805-815.
Kubo, et al.; "Lignin-Based Carbon Fibers: Effect of Synthetic Polymer Blending of Fiber Properties"; Journal of Polymers and the Environment; vol. 13, No. 2, 97-105 (Apr. 1, 2005).
Kubo, S. et al., "Hydrogen Bonding in Lignin: A Fourier Transform Infrared Model Compound Study," Biomacromolecules 2005, 6, pp. 2815-2821.
Kubo, S. et al., "Kraft Lignin/Poly (ethylene oxide) Blends: Effect of Lignin Structure on Miscibility and Hydrogen Bonding," Journal of Applied Polymer Science 2005, 98, pp. 1437-1444.
Kubo, S. et al., "Poly (Ethylene Oxide)/ Organosolv Lignin Blends: Relationship between Thermal properties, Chemical Structure, and Blend Behaviour"; Macromolecules; vol. 37, pp. 6904-6911 (2004).

(56) References Cited

OTHER PUBLICATIONS

Kues, Ursula (Ed.), "Wood Production, Wood Technology and Biotechnological Impacts", Jan. 1, 2007 (Jan. 1, 2007), Gottingen : Univ.-Verl. Gottingen, 2007, DE, p. 448.
Kurabi, A., et al. "Enzymatic Hydrolysis of Steam-Exploded and Ethanol Organosolv-Pretreated Douglas-Fir by Novel and Commercial Fungal Cellulases," App. Biochem. Biotech., vol. 121-124, 2005, 219-230.
Liu, H. et al.: "Study on preparation and application in flocculants of modified lignin", Modern Applied Science, Feb. 2011 (Feb. 2011) vol. 5, No. 1, pp. 205-208, 1SSN:1913-1844.
Lucia, LA et al. "Comparative Evaluation of Oxygen Delignification Processes for Low- and High-Lignin-Content Softwood Kraft Pulps" Ind. Eng. Chem. Res. 2002, 41, 5171-5180.
Luo, C., et al., "Identification of potential fermentation inhibitors in conversion of hybrid poplar hydrolyzate to ethanol," Biomass and Bioenergy, 2002, 22, 125-138.
Luo; "Lignin-Based Cargon Fiber—Thesis"; University of Maine (May 2010).
Mabee WE et al. Updates on softwood-to-ethanol process development. Applied Biochemistry and Biotechnology Mar. 2006 (Mar. 2006), vol. 129(1-3), pp. 55-70, ISSN: 0273-2289.
Mansson, P. "Quantitative Determination of Phenolic and Total Hydroxyl Groups in Lignin," Holzforschung, 1983, 37, 143-146.
Marchessault, R.H., "Chemrawn Again!," Cellulose, vol. 14, Aug. 2007, pp. 281-282, XP019524885.
Megiatto, J.D. et al., "Sisal Fibers: Surface Chemical Modification Using Reagent Obtained from a Renewable Source; Characterization of Hemicellulose and Lignin as Model Study," J. Agric. Food Chem. 2007, 55, pp. 8576-8584.
Meier et al. "On Properties and Degradability of Lignins", Isolated with Alcohol-Water Mixtures. Holzforschung vol. 35 (1981), Part 5, p. 247-252.
Nada A M A et al: "Infrared spectroscopic characteristics of bagasse cresol lignin", Polymer Degradation and Stability, Barking, GB, vol. 43, No. 1, Jan. 1, 1994 (Jan. 1, 1994), pp. 55-59, XP024144586.
Nenkova, et al.; "Study of the Sorption Properties of Technical Hydrolysis Lignin and Wool Shoddy Towards Oil Pollution"; Journal of the University of Chemical Technology and Metallurgy; vol. 43, No. 2, pp. 217-222 (2008).
Nieminen, et al.; "Determination of Hydroxyl Groups in Kraft Pine Lignin by Silicon-29 NMR Spectroscopy"; Holzforschung: International Journal of the Biology, Chemistry, Physics and Technology of Wood; vol. 43, No. 5, pp. 303-307 (Jan. 1, 1989).
Olempska-Beer, Z.: "Alpha-amylase from Bacillus licheniformis containing a genetical-ly engineered alpha-amylase gene from B. licheniformis (thermostable)", 61st JECFA—Chemical and Technical Assessments of Food Additives (CTA), 2004, pp. 1(6)-6(6).
Olson et al.: "Levulinate Esters from Biomass Wastes"; ACS Symposium Series, 2001, vol. 784, Chapter 5, pp. 51-63.
Palmqvist E et al: "Fermentation of Lignocellulosic Hydrolysates I: Inhibition and Detoxification", Bioresource Technology, Elsevier BV, GB, vol. 74, No. 1, Jan. 1, 2000 (Jan. 1, 2000), pp. 17-24, XP001016127.
Pan X. et al. Biorefining of softwoods using ethanol organosolv pulping: preliminary evaluation of process streams for manufacture of fuel grade ethanol and co-products. Biotechnology and Bioengineering May 20, 2005 May 4-20, 2005), vol. 90(4), pp. 473-481, ISSN: 1097-0290.
Pan, X et al. "Organosolv Ethanol Lignin from Hybrid Poplar as a Radial Scavenger: Relationship be-tween Lignin Structure, Extraction Conditions, and Antioxidant Activity". J. Agric. Food Chem 2006, 54, 5806-5813.
Pan, X et al. "The Bioconversion of Mountain Pine Beetle-Killed Lodgepole Pine to Fuel Ethanol Using the Organolsolv Process". Biotechnology and Bioengineering 2008, 101(1). 39-48.
Pan, X.P. et al., "Bioconversion of Hybrid Poplar to Ethanol and Co-Products Using an Organosolv Fractionation Process: Optimization of Process Yields", Biotechnology and Bioengineering, vol. 94, No. 5, pp. 851-861, Aug. 5, 2006 (May 8, 2006), Published online Mar. 7, 2006 (Jul. 3, 2006) in Wiley InterScience (www.interscience.wiley.com).
Pan, X.P. et al., "Pretreatment of Lodgepole Pine Killed by Mountain Pine Beetle Us-ing the Organosolv Process: Fractionation and Process Optimization", Ind. Eng. Chem. Res. 2007, 46, pp. 2609-2617, Published on Web Mar. 14, 2007 (Mar. 14, 2007).
Pasquini D et al: "Extraction of lignin from sugar cane bagasse and Pinus taeda wood chips using ethanol- water mixtures and carbon dioxide at high pressures", Journal of Supercritical Fluids, PRA Press, US, vol. 36, No. 1, Nov. 1, 2005 (Nov. 1, 2005), pp. 31-39, XP027818818, ISSN: 0896-8446.
Pu, Y. et al., "Investigation of the photo-oxidative chemistry of acetylated softwood lignin," Journal of Photochemistry and Photobiology: A Chemistry 163, 2004, pp. 215-221.
Pu, Y. et al., "Structural analysis of acetylated hardwood lignins and their photoyellowing properties," Can. J. Chem. 2005, 83, pp. 2132-2139.
Pye, E. Kendall et al. "The AlcellTM process a proven alternative to kraft pulping", Tappi Journal, Mar. 1991, pp. 113-117.
Ruiz-Rosas, et al.; "The Production of Submicron Diameter Carbon Fibers by the Electrospinning of Lignin"; Carbon, Elsevier, Oxford, GB; vol. 48, No. 3, pp. 696-705 (Mar. 1, 2010).
Said, et al.; "Usefulness of Raw Bagasse for Oil Absorption: A Comparison of Raw and Acylated Bagasses and their Components"; Bioresource Technology 100; pp. 2219-2222 (2009).
Sannigrahi, P et al. "Lignin Structural Modifications Resulting from Ethanol Organosolv Treatment of Lob-lolly Pine", Energy Fuels 2010, 24. 683-689.
Sayed, et al.; "Oil Spill Pollution Treatment by Sorption on Natural Cynanchum Acutum L. Plant"; Journal of Applied Sciences & Environmental Management; vol. 7, No. 2, pp. 63-73 (Dec. 2003).
Sealey, J et al., "Residual Lignin Studies of Laccase Delignified Kraft Pulps," IPST Technical Paper Series, No. 621, Institute of Paper Science and Technology, Aug. 1996, 7 pages.
Shu-Bin Wu et al: "Chemical structures and thermochemical properties of bagasse lignin", Forestry Studies in China, Beijing Forestry University, BE, vol. 8, No. 3, Sep. 1, 2006 (Sep. 1, 2006), pp. 34-37, XP019440259.
Sidiras, D., et al., "Simulation of acid-catalysed organosolv fractionation of wheat straw," Bioresource Technology 94 (2004) 98.
Sun, X.-F., et al., "Extraction and characterization of original lignin and hemicelluloses from wheat straw," J. Agric. Food Chem., 2005, 53, 860-870.
Sun, et al.; "Acetylation of Rice Straw with or without Catalysts and its Characterization as a Natural Sorbent in Oil Spill Cleanup"; Journal of Agricultural and Food Chemistry; vol. 50, No. 22, pp. 6428-6433 (Oct. 1, 2002).
Taherzadeh, Mohammad J., et al. "Enzyme-Based Hydrolysis Processes for Ethanol from Lignocellulosic Materials: A Review," Bioresources, vol. 2, Nov. 2007, pp. 707-738, XP008130300.
Tai, D., et al. "Biodegradation of guaiacyl and guaiacyl-syringyl lignins in wood by Phanerochaete chrysosporium." Recent advances in lignin biodeterioration: proceedings of an international seminar, organized under the auspices of the US-Japan cooperative science program. Uni Publishers Co. Ltd. Uni Publishers, 1983.
Tanaka, M. et al.: "Removal of lignin and reuse of cellulases for continuous sacchari-fication of lignocelluloses", Biotechnology and Bioengineering, Sep. 20, 1988 (Sep. 20, 1988) vol. 32, No. 7, pp. 897-902, ISSN: 0006-3592.
Tejado et al., "Isocyanate curing of novolac-type ligon-phenol-formaldehyde resins", Industrial Crops and Products, vol. 27, No. 2, pp. 208-213, Dec. 21, 2007.
Tejado, A et al. "Physico-chemical characterization of lignins from different sources for use in phe-nol-formaldehyde resin synthesis" Bioresource Technology 2007, 98, 1655-1663.
Tohmura, Shin-ichiro et al., "Determination of Arylglycerol-fi—aryl Ethers and Other Linkages in Lignins Using DFRC/31 P NMR," J. Agric. Food Chem. 2001, 49, pp. 536-542.
Tolbert, A. et al. "Characterization and Analysis of the Molecular Weight of Lignin for Biorefining Studies," Biofuels, Bioprod. Bioref., 2014, Review, 21 pages.

(56) References Cited

OTHER PUBLICATIONS

Van Maris, Antonius J A, et al.: "Alcoholic fermentation of carbon sources in biomass hydrolysates by *Saccharomyces cerevisiae*: current status", Antonie Van Leeuwenhoek, Kluwer Academic Publishers, DO, vol. 90, No. 4, Oct. 11, 2006 (Oct. 11, 2006), pp. 391-418, XP019446684.
Vinardell, M.P. et al., "Potential applications of antioxidant lignins from different sources," Industrial Crops and Products 2008, pp. 220-223.
Vinardell; "Application of Lignins from Different Sources as Antioxidant"; Detergent & Cosmetics; vol. 31, No. 9, pp. 28-30 (Sep. 25, 2008). (English Abstract).
Wang, Y. et al.: "Application of a novel cationic polyacrylamide as flocculant in treat-ment of papermaking wastewater", Jun. 2010 (Jun. 2010) Bioinformatics and Bio-Medical Engineering, 2010 4th International Conference, pp. 1-4, ISSN: 2151-7614.
Wu, et al.; "Development of Lignin/Polyolefin Composites"; China Plastics Industry; vol. 37, No. 6, pp. 1-5 (Jun. 20, 2009). (English Abstract).
Wu, S. et al., "An Improved Method for Isolating Lignin in High Yield and Purity," Journal of Pulp and Paper Science Jul. 2003, vol. 29, No. 7, pp. 235-240.
Xia et al.: "Quantitative 13C NMR Analysis of Lignins with Internal Standards". J. Agric. Food Chem. 2001, 49, 3573-3378.
Xu et al., Catalytic Liquefaction of Hydrolytic Lignin in Supercritical Ethanol Solution (II): Effect of Reaction Time, Ratio of Solvent/ HL & Atmosphere on Reaction, Acta Energiae Solaris Sinica, 28(7), p. 805-809—English Abstract.
Xu, F., et al., "Comparative study of organosolv lignins from wheat straw," Industrial Crops and Products 23 (2006) 180-193.
Xue, B-L et al. "Polyols Production by Chemical Modification of Autocatalyzed Ethanol-Water lignin from Betula Alnoides". Paper PS-79. Proceedings of the 55th International Convention of Society of IVood Science and Technology Aug. 27-31, 2012, Beijing, China.
Yang, R. et al., "Oxygen Degradation and Spectroscopic Characterization of Hardwood Lignin," Ind. Eng. Chem. Res. 2002, 41, pp. 5941-5948.
Zawadzki, M. et al., "N-Hydroxy Compounds as New Internal Standards for the 31P-NMR Determination of Lignin Hydroxy Functional Groups," Holzforschung 2001, 55, 3, pp. 283-285.
Zhang et al. "Removal of Residual Lignin of Ethanol-Based Organosolv Pulp by an Alkalu Extraction Process," J. Applied Polymer Science, 2007, vol. 106, pp. 630.
Zhang, Yi-Heng et al. "Fractionating Recalcitrant Lignocellulose at Modest Reaction Conditions", Biotechnology and Bioengineering, vol. 97, No. 2, Jun. 1, 2007, pp. 214-223.
Zhou Xue-fei "AS-AQ Pulping of Eucalyptus Wood and The Structural Change of Lignin During Pulping". Chemistry and Industry of Forest Products 2004, 24, 107-110 (English Abstract).
"Cincalehah", Database Traditional Knowledge Digital Library, Database accession No. SJ/1103, Rasayoga Sagara—Compiled and Translated by Vaidya Pandita Hariprapanna Ji ,vol.-I : Krishnadas Academy, Varanasi, Edn. Reprint, 1999. p. 442-443.
"Baloot", Database Traditional Knowledge Digital Library, Database accession No. AN4/83, Ali Ibn-e-Abbaas Majoosi; Kaamil-al-Sena'ah, Part I (10th century AD), Central Council for Research in Unani Medicine, 61-65 Institutional Area, Janak Puri, New Delhi-58, 2005 AD p. 190.
"Khadiraniryasa Rasa Prayoga", Database Traditional Knowledge Digital Library, Database accession No. RG1/1500, Cakraparlidattah; Cakradattah—Translated by Indradeva Tripathi; Chaukhamba Sanskrit Samsthan (Varanasi), Ed. 4th 2002. p. 285.
"Velli Parpam", Database Traditional Knowledge Digital Library, Database accession No. GP01/265, Therayar; Therayar Sekarappa Publisher: C.C.R.A.S, New Delhi.(Edn: 1st, 1979). p. 200-202.
"Majoon-E-Moosli Paak", Database Traditional Knowledge Digital Library, Database accession No. MA3/629, Mohammad Kabiruddin; Bayaaz-e—Kabir, vol. II (Compiled), Daftar-al- Maseeh, Karol Bagh, New Delhi, 1938 AD p. 173-174.
"Sanoobar", Database Traditional Knowledge Digital Library, Database accession No. AA21/87E, Abu Bakr Mohammad.Bin Zakariyya Al-Razi; Kitaab-al-Haawi-fil-Tibb, vol. XXI Part I ($9^{th}$ century AD), Dayerah-al—Ma'aarif Usmania, Hyderabad, (First Edition) 1968 AD p. 128.
"Vasantakusumakararasa", Database Traditional Knowledge Digital Library, Data-base accession No. AK9/717, Cuadmarii; Rasakamadhenu Sarhhita—Edited by Jivaramakalidasa Sastri, Part 4, Chaukhambha Publishers, Varanasi, Edn. 1st 1992 p. 235.
"Rasayanaristah", Database Traditional Knowledge Digital Library, Database accession No. RS/992, Sodhala; Gadanigrahah ed,Ganga Sahaya Pandeya & Corn.—Indradeva Tripathi,Part-I(Prayoga 2 Khanda) Chaukhamba Sanskrit Sansthan, Varanasi, Ed. 3rd 1999 p. 392.
"Baladi Ausadh", Database Traditional Knowledge Digital Library, Database accession No. AJ/697, Harita; Harita Samhita—Translated by Hariharaprasada Tripathi, Chaukhambha Krishnadas Academy (Varanasi), Ed. 1st 2005 p. 352-353.
Cateto, et al., Lignins as Macromonomers for Polyurethane Synthesis: A Comparative Study on Hydroxyl Group Determination. J. of Applied Polymer Science, vol. 109, 3009-3017 (2008).
International Preliminary Report on Patentability dated Aug. 30, 2012 for International Application No. PCT/CA2011/0000182.
International Search Report and Written Opinion dated Apr. 21, 2011 for International Application No. PCT/CA2011/0000182.

\* cited by examiner

BINDER COMPOSITIONS COMPRISING LIGNIN DERIVATIVES

This application is a divisional application of U.S. application Ser. No. 14/798,396, filed Jul. 13, 2015; which is a continuation of U.S. application Ser. No. 13/584,651, filed Aug. 13, 2012; which is a continuation of PCT/CA2011/000182, filed Feb. 15, 2011; which claims the priority of U.S. Provisional Application No. 61/304,745, filed Feb. 15, 2010; U.S. Provisional Application No. 61/304,742, filed Feb. 15, 2010; and PCT/CA2010/000800, filed May 27, 2010. The contents of the above-identified applications are incorporated herein by reference in their entirety.

TECHNICAL FIELD

This disclosure relates to derivatives of native lignin recovered from lignocellulosic feedstocks, and industrial applications thereof. More particularly, this disclosure relates to compositions, uses, processes and methods utilizing derivatives of native lignin.

BACKGROUND

Native lignin is a naturally occurring amorphous complex cross-linked organic macromolecule that comprises an integral component of all plant biomass. The chemical structure of lignin is irregular in the sense that different structural units (e.g., phenylpropane units) are not linked to each other in any systematic order. It is known that native lignin comprises pluralities of two monolignol monomers that are methoxylated to various degrees (trans-coniferyl alcohol and trans-sinapyl alcohol) and a third non-methoxylated monolignol (trans-p-coumaryl alcohol). Various combinations of these monolignols comprise three building blocks of phenylpropanoid structures i.e. guaiacyl monolignol, syringyl monolignol and p-hydroxyphenyl monolignol, respectively, that are polymerized via specific linkages to form the native lignin macromolecule.

Extracting native lignin from lignocellulosic biomass during pulping generally results in lignin fragmentation into numerous mixtures of irregular components. Furthermore, the lignin fragments may react with any chemicals employed in the pulping process. Consequently, the generated lignin fractions can be referred to as lignin derivatives and/or technical lignins. As it is difficult to elucidate and characterize such complex mixture of molecules, lignin derivatives are usually described in terms of the lignocellulosic plant material used, and the methods by which they are generated and recovered from lignocellulosic plant material, i.e. hardwood lignins, softwood lignins, and annual fibre lignins.

Native lignins are partially depolymerized during the pulping processes into lignin fragments which are soluble in the pulping liquors and subsequently separated from the cellulosic pulps. Post-pulping liquors containing lignin and polysaccharide fragments, and other extractives, are commonly referred to as "black liquors" or "spent liquors", depending on the pulping process. Such liquors are generally considered a by-product, and it is common practice to combust them to recover some energy value in addition to recovering the cooking chemicals. However, it is also possible to precipitate and/or recover lignin derivatives from these liquors. Each type of pulping process used to separate cellulosic pulps from other lignocellulosic components produces lignin derivatives that are very different in their physico-chemical, biochemical, and structural properties.

Given that lignin derivatives are available from renewable biomass sources there is an interest in using these derivatives in certain industrial processes. For example, U.S. Pat. No. 5,173,527 proposes using lignin-cellulosic materials in phenol-formaldehyde resins. A. Gregorova et al. propose using lignin in polypropylene for it radical scavenging properties (A. Gregorova et al., Radical scavenging capacity of lignin and its effect on processing stabilization of virgin and recycled polypropylene, Journal of Applied Polymer Science 106-3 (2007) pp. 1626-1631).

However, large-scale commercial application of the extracted lignin derivatives, particularly those isolated in traditional pulping processes employed in the manufacture of pulp and paper, has been limited due to, for example, the inconsistency of their chemical and functional properties. This inconsistency may, for example, be due to changes in feedstock supplies and the particular extraction/generation/recovery conditions. These issues are further complicated by the complexity of the molecular structures of lignin derivatives produced by the various extraction methods and the difficulty in performing reliable routine analyses of the structural conformity and integrity of recovered lignin derivatives. Nevertheless efforts continue to use lignin derivatives on a commercial scale.

For many years fibreboard products have been manufactured from wood or agricultural substrates using various adhesives. Formaldehyde-based resins such as phenol formaldehyde (PF), urea formaldehyde (UF) and melamine formaldehyde (MF) are extremely common and used for a variety of purposes such as manufacturing of housing and furniture panels such as medium density fibreboard (MDF), oriented strand board (OSB), plywood, and particleboard. Concerns about the toxicity of formaldehyde have led regulatory authorities to mandate the reduction of formaldehyde emissions (e.g. California Environmental Protection Agency Airborne Toxic Control Measure (ATCM) to Reduce Formaldehyde Emissions from Composite Wood Products, Apr. 26, 2007). There have been attempts to add lignin derivatives to formaldehyde-based resins. However, such attempts have not been entirely successful. For example, past attempts at adding Alcell® lignin to PF resins have been largely unsuccessful due to the relatively poor performance characteristics of the final product where the normalized Alcell® lignin-PF resin bond strength at 150° C. was 3,079 MPa*cm$^2$/g as tested by the ABES method (Wescott, J. M., Birkeland, M. J., Traska, A. E., New Method for Rapid Testing of Bond Strength for Wood Adhesives, Heartland Resource Technologies Waunakee, Wis., U.S.A. and Frihart, C. R. and Dally, B. N., USDA Forest Service, Forest Products Laboratory, Madison, Wis., U.S.A., Proceedings 30$^{th}$ Annual Meeting of The Adhesion Society, Inc., Feb. 18-21, 2007, Tampa Bay, Fla., USA). These values are significantly lower than the current commercial adhesives. For instance, plywood or OSB made with PF resins are expected to have a bond strength in the region of 3,200-3,600 MPa*cm$^2$/g. Furthermore, lignin-containing PF-resins often do not cure quickly enough or completely enough under normal production conditions for fibreboard. This lack of cure-speed and lack of bond strength has limited the amount of lignin derivative that has been included in the formaldehyde-resins to relatively low levels.

An adhesive should meet certain criteria in order to be acceptable for industrial use. For example, the adhesive will preferably be available in a stable form such as a spray-dried powder or stable liquid. The adhesive will preferably set quickly enough to enable its use as a core adhesive for thick multi-layer panels but should not suffer from excessive "pre-cure".

Methylene diphenyl diisocyanate (MDI) is a widely used diisocyanate commonly used in the manufacture of polyurethanes and as an adhesive. MDI has the advantage that it is highly reactive and has strong bondability as well as being formaldehyde free. MDI polymerizes in the presence of water which reduce the ecological risks associated with its use.

It is known to use isocyanate-based binders such as MDI for fibreboard (see, for example, U.S. Pat. No. 6,692,670) but they have not, to date, been widely adopted for various reasons such as cost, cure-rate, and the need for release-agents to avoid the board sticking to the press-plates.

A significant issue with the use of MDI is its high sensitivity to moisture and temperature. In many manufacturing processes MDI suffers from significant premature polymerization (pre-cure) leading to substantial loss of resin efficiency and, hence, higher resin consumption. It is estimated that as much as 10% of the MDI may be lost to pre-curing leading to increased costs and decreased process efficiency.

SUMMARY

The present disclosure provides an adhesive composition comprising derivatives of native lignin and an isocyanate-based binder such as methylene diphenyl diisocyanate. The present compositions may further comprise formaldehyde-based resins such as PF, UF, and MF. While not wishing to be bound by theory, it is believed that incorporating derivatives of native lignin in isocyanate compositions will reduce incidence of pre-curing.

As used herein, the terms "methylene diphenyl diisocyanate" and "MDI" encompass oligomers of methylene diphenyl diisocyanate sometimes referred to as "pMDI" or "polymethylene polyphenylene polyisocyanate"

As used herein, the term "native lignin" refers to lignin in its natural state, in plant material.

As used herein, the terms "lignin derivatives" and "derivatives of native lignin" refer to lignin material extracted from lignocellulosic biomass. Usually, such material will be a mixture of chemical compounds that are generated during the extraction process.

This summary does not necessarily describe all features of the invention. Other aspects, features and advantages of the invention will be apparent to those of ordinary skill in the art upon review of the following description of specific embodiments of the invention.

DETAILED DESCRIPTION

The present disclosure provides compositions comprising isocyanate-based binder such as methylene diphenyl diisocyanate (MDI) and derivatives of native lignin. MDI compositions comprising lignin derivatives suffer from a lower incidence of pre-cure. While not wishing to be bound by theory, lignin derivatives may reduce the sensitivity of MDI to moisture and temperature, the latter being factors responsible for early MDI polymerization ("precure"). The incorporation of lignin in MDI can be problematic due to the instability and irregularity of the resulting lignin-containing MDI resins. The present compositions may comprise formaldehyde-based resins comprising lignin derivatives such as lignin-phenol formaldehyde (LPF). It is believed that the presence of isocyanate-based binder improves the cure-speed of the LPF making it more suitable for industrial applications such as an adhesive for the core of a multi-layer fibreboard. It is further believed that the presence of isocyanate-based binder allows increased amounts of the formaldehyde-based resin to be substituted with lignin derivative. For example, the present compositions may comprise 30% or more, 35% or more, 40% or more, by weight of lignin derivative.

Any suitable isocyanate-based binder. For example, polymeric MDI (polymethylene polyphenylene polyisocyanate) such as emulsifiable, polymeric MDI's may be used. Examples of commercially available polymeric MDI include I-Bond® and Rubinate® such as Rubinate 1840 isocyanate, Rubinate M isocyanate, Rubinate 1780 isocyanate, available from Huntsman Polyurethanes located in West Deptford, N.J. The MDI preferably has a diisocyanate content of about 50% or less, about 48% or less, about 45% or less, about 40% or less, by weight.

The polymeric MDI may also contain urethane modifications, isocyanurate modifications, biurets, ureas, etc. The polymeric MDI may be modified to be water dispersible, and applied in an aqueous emulsion form. Such a method for modifying the polymeric MDI to be water dispersible is fully disclosed in the above-identified U.S. Pat. No. 3,996,154.

The polymeric MDI may be used alone, or in conjunction with other binder materials, including, but not limited to, formaldehyde containing binder materials, diluents, extenders, fillers, etc. Suitable extenders include, for example, oils, such as soy oil and linseed oil, solvents, lignin, carbohydrates, etc. Suitable fillers include, for example, fibreglass, plastics, waste materials, etc. Moreover, the polymeric MDI may also include fire retardants, such as, for example, ammonium polyphosphates, trichloropropyl phosphate (TCPP), melamine, triphenyl phosphate, etc. Furthermore, the polymeric MDI may also include suitable release agents, such as, for example, soaps, fatty acids, waxes, silicones, fatty acid salts, etc.

Additionally, the polymeric MDI may also include biocides, such as boric acid, etc.

The present disclosure provides derivatives of native lignin recovered during or after pulping of lignocellulosic feedstocks. The pulp may be from any suitable lignocellulosic feedstock including hardwoods, softwoods, annual fibres, and combinations thereof.

Hardwood feedstocks include *Acacia*; Afzelia; *Synsepalum duloificum*; Albizia; Alder (e.g. *Alnus glutinosa, Alnus rubra*); Applewood; Arbutus; Ash (e.g. *F. nigra, F. quadrangulata, F. excelsior, F. pennsylvanica lanceolata, F. latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Diospyros kurzii, Diospyros melanida, Diospyros crassiflora*); Elm (e.g. *Ulmus americana, Ulmus procera, Ulmus thomasii, Ulmus* rubra, Ulmus glabra); Eucalyptus; Greenheart; Grenadilla; Gum (e.g. *Nyssa sylvatica, Eucalyptus globulus, Liquidambar styraciflua, Nyssa aquatica*); Hickory (e.g. *Carya alba, Carya glabra, Carya ovata, Carya laciniosa*); Hornbeam; Hophornbeam; Ipê; Iroko; Ironwood (e.g. Bangkirai, *Carpinus caroliniana, Casuarina equisetifolia, Choricbangarpia subargentea, Copaifera* spp., *Eusideroxylon zwageri, Guajacum officinale, Guajacum sanctum, Hopea odorata,* Ipe, *Krugiodendron ferreum, Lyonothamnus lyonii (L. floribundus), Mesua ferrea, Olea* spp., *Olneya tesota, Ostrya virginiana, Parrotia persica, Tabebuia serratifolia*); Jacarandá; Jotoba; Lacewood; Laurel; Limba; Lignum vitae; Locust (e.g. *Robinia pseudacacia, Gleditsia triacanthos*); Mahogany; Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus muhlenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoumé; Oregon Myrtle; California Bay Laurel; Pear; Poplar (e.g. *P. balsamifera, P. nigra,* Hybrid Poplar (*Populus×canadensis*)); Ramin; Red cedar; Rosewood; Sal; Sandalwood; *Sassafras*; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks for the present disclosure may be selected from *Acacia,* Aspen, Beech, *Eucalyptus,* Maple, Birch, Gum, Oak, Poplar, and combinations/hybrids thereof. The hardwood feedstocks for the present disclosure may be selected from *Populus* spp. (e.g. *Populus tremuloides*), *Eucalyptus* spp. (e.g. *Eucalyptus globulus*), *Acacia* spp. (e.g. *Acacia dealbata*), and combinations/hybrids thereof.

Softwood feedstocks include *Araucaria* (e.g. *A. cunninghamii, A. angustifolia, A. araucana*); softwood Cedar (e.g. *Juniperus virginiana, Thuja plicata, Thuja occidentalis, Chamaecyparis thyoides Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus sempervirens*); Rocky Mountain Douglas fir; European Yew; Fir (e.g. *Abies balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*); Pine (e.g. *Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations thereof. The softwood feedstocks for the present disclosure may be selected from loblolly pine (*Pinus taeda*), radiata pine, jack pine, spruce (e.g., white, interior, black), Douglas fir, *Pinus silvestris, Picea abies,* and combinations/hybrids thereof. The softwood feedstocks for the present disclosure may be selected from pine (e.g. *Pinus radiata, Pinus taeda*); spruce; and combinations/hybrids thereof.

Annual fibre feedstocks include biomass derived from annual plants, plants which complete their growth in one growing season and therefore must be planted yearly. Examples of annual fibres include: flax, cereal straw (wheat, barley, oats), sugarcane bagasse, rice straw, corn stover, hemp, fruit pulp, alfa grass, switchgrass, and combinations/hybrids thereof. Industrial residues like corn cobs, fruit peals, seeds, etc. may also be considered annual fibres since they are commonly derived from annual fibre biomass such as edible crops and fruits. For example, the annual fibre feedstock may be selected from wheat straw, corn stover, corn cobs, sugar cane bagasse, and combinations/hybrids thereof.

The derivatives of native lignin will vary with the type of process used to separate native lignins from cellulose and other biomass constituents. Preparations very similar to native lignin can be obtained by (1) solvent extraction of finely ground wood (milled-wood lignin, MWL) or by (2) acidic dioxane extraction (acidolysis) of wood. Derivatives of native lignin can be also isolated from biomass pretreated using (3) steam explosion, (4) dilute acid hydrolysis, (5) ammonia fibre expansion, (6) autohydrolysis methods. Derivatives of native lignin can be recovered after pulping of lignocellulosics including industrially operated (3) kraft and (4) soda pulping (and their modifications) and (5) sulphite pulping. In addition, a number of various pulping methods have been developed but not industrially introduced. Among them four major "organosolv" pulping methods tend to produce highly-purified lignin mixtures. The first organosolv method uses ethanol/solvent pulping (aka the Alcell® process); the second organosolv method uses alkaline sulphite anthraquinone methanol pulping (aka the "ASAM" process); the third organosolv process uses methanol pulping followed by methanol, NaOH, and anthraquinone pulping (aka the "Organocell" process); the fourth organosolv process uses acetic acid/hydrochloric acid or formic acid pulping (aka the "Acetosolv" process).

It should be noted that kraft pulping, sulphite pulping, and ASAM organosolv pulping will generate derivatives of native lignin containing significant amounts of organically-bound sulphur which may make them unsuitable for certain uses. Acid hydrolysis, soda pulping, steam explosion, Alcell® pulping, Organocell pulping, and Acetosolv pulping will generate derivatives of native lignin that are sulphur-free or contain low amounts of inorganic sulphur.

Organosolv processes, particularly the Alcell® process, tend to be less aggressive and can be used to separate highly purified lignin derivatives and other useful materials from biomass without excessively altering or damaging the native lignin building blocks. Such processes can therefore be used to maximize the value from all the components making up the biomass. Organosolv extraction processes however typically involve extraction at higher temperatures and pressures with a flammable solvent compared to other industrial processes and thus are generally considered to be more complex and expensive.

A description of the Alcell® process can be found in U.S. Pat. No. 4,764,596 (herein incorporated by reference). The process generally comprises pulping or pre-treating a fibrous biomass feedstock with primarily an ethanol/water solvent solution under conditions that include: (a) 60% ethanol/40% water, (b) temperature of about 180° C. to about 210° C., (c) pressure of about 20 atm to about 35 atm, and (d) a processing time of 5-120 minutes. Derivatives of native lignin are fractionated from the native lignins into the pulping liquor which also receives solubilised hemicelluloses, other carbohydrates and other extractives such as resins, organic acids, phenols, and tannins. Organosolv pulping liquors comprising the fractionated derivatives of native lignin and other extractives from the fibrous biomass feedstocks, are often called "black liquors". The organic acid and extractives released by organosolv pulping significantly acidify the black liquors to pH levels of about 5 and lower. After separation from the cellulosic pulps produced during the pulping process, the derivatives of native lignin are recovered from the black liquors by depressurization followed by flashing with cold water which will cause the fractionated derivatives of native lignin to precipitate thereby enabling their recovery by standard solids/liquids separation processes. Various disclosures exemplified by U.S. Pat. No. 7,465,791 and PCT Patent Application Publication No. WO 2007/129921, describe modifications to the Alcell organosolv process for the purposes of increasing the yields of fractionated derivatives of native lignin recovered from fibrous biomass feedstocks during biorefining. Modifications to the Alcell organosolv process conditions included adjusting: (a) ethanol concentration in the pulping liquor to a value selected from a range of 35%-85% (w/w) ethanol, (b) temperature to a value selected from a range of 100° C. to 350° C., (c) pressure to a value selected from a range of 5 atm to 35 atm, and (d) processing time to a duration from a range of 20 minutes to about 2 hours or longer, (e) liquor-to-wood ratio of 3:1 to 15:1 or higher, (f) pH of the cooking liquor from a range of 1 to 6.5 or higher if a basic catalyst is used.

The derivatives of native lignin herein may be obtained by:

(a) pulping a fibrous biomass feedstock with an organic solvent/water solution, (b) separating the cellulosic pulps or pre-treated substrates from the pulping liquor or pre-treatment solution, (c) recovering derivatives of native lignin.

The organic solvent may be selected from short chain primary and secondary alcohols, such as such as methanol, ethanol, propanol, and combinations thereof. For example, the solvent may be ethanol. The liquor solution may comprise about 20%, by weight, or greater, about 30% or greater, about 50% or greater, about 60% or greater, about 70% or greater, of ethanol.

Step (a) of the process may be carried out at a temperature of from about 100° C. and greater, or about 120° C. and greater, or about 140° C. and greater, or about 160° C. and greater, or about 170° C. and greater, or about 180° C. and greater. The process may be carried out at a temperature of from about 300° C. and less, or about 280° C. and less, or about 260° C. and less, or about 240° C. and less, or about 220° C. and less, or about 210° C. and less, or about 205° C. and less, or about 200° C. and less.

Step (a) of the process may be carried out at a pressure of about 5 atm and greater, or about 10 atm and greater, or about 15 atm and greater, or about 20 atm and greater, or about 25 atm and greater, or about 30 atm and greater. The process may be carried out at a pressure of about 150 atm and less, or about 125 atm and less, or about 115 atm and less, or about 100 atm and less, or about 90 atm and less, or about 80 atm and less.

The fibrous biomass may be treated with the solvent solution of step (a) for about 1 minute or more, about 5 minutes or more, about 10 minutes or more, about 15 minutes or more, about 30 minutes or more. The fibrous biomass may be treated with the solvent solution of step (a) at its operating temperature for about 360 minutes or less, about 300 minutes or less, about 240 minutes or less, about 180 minutes or less, about 120 minutes or less.

The pH of the pulp liquor may, for example, be from about 1 to about 6, or from about 1.5 to about 5.5.

The weight ratio of liquor to biomass may be any suitable ratio. For example, from about 4 or 5:1 to about 15:1, from about 5.5:1 to about 10:1; from about 6:1 to about 8:1.

The lignin derivatives herein may, for example, have an aliphatic hydroxyl content of from about 0.1 mmol/g to about 8 mmol/g; about 0.4 mmol/g to about 7 mmol/g; about 0.6 mmol/g to about 6.5 mmol/g; about 0.8 mmol/g to about 6 mmol/g.

The term "aliphatic hydroxyl content" refers to the quantity of aliphatic hydroxyl groups in the lignin derivatives and is the arithmetic sum of the quantity of primary and secondary hydroxyl groups (OHal=OHpr+OHsec). The aliphatic hydroxyl content can be measured by quantitative $^{13}C$ high resolution NMR spectroscopy of acetylated and non-acetylated lignin derivatives, using, for instance, 1,3,5-trioxane and tetramethyl silane (TMS) as internal reference. For the data analysis "BASEOPT" (DIGMOD set to baseopt) routine in the software package TopSpin 2.1.4 was used to predict the first FID data point back at the mid-point of $^{13}C$ r.f. pulse in the digitally filtered data was used. For the NMR spectra recording a Bruker AVANCE II digital NMR spectrometer running TopSpin 2.1 was used. The spectrometer used a Bruker 54 mm bore Ultrashield magnet operating at 14.1 Tesla (600.13 MHz for $^1H$, 150.90 MHz for $^{13}C$). The spectrometer was coupled with a Bruker QNP cryoprobe (5 mm NMR samples, $^{13}C$ direct observe on inner coil, $^1H$ outer coil) that had both coils cooled by helium gas to 20K and all preamplifiers cooled to 77K for maximum sensitivity. Sample temperature was maintained at 300 K±0.1 K using a Bruker BVT 3000 temperature unit and a Bruker BCU05 cooler with ca. 95% nitrogen gas flowing over the sample tube at a rate of 800 L/h.

The present lignin derivatives may have any suitable phenolic hydroxyl content such as from about 2 mmol/g to about 8 mmol/g. For example, the phenolic hydroxyl content may be from about 2.5 mmol/g to about 7 mmol/g; about 3 mmol/g to about 6 mmol/g.

The present lignin derivatives may have any suitable number average molecular weight (Mn). For example, the Mn may be from about 200 g/mol to about 3000 g/mol; about 350 g/mol to about 2000 g/mol; about 500 g/mol to about 1500 g/mol.

The present lignin derivatives may have any suitable weight average molecular weight (Mw). For example, the Mw may be from about 500 g/mol to about 5000 g/mol; about 750 g/mol to about 4000 g/mol; about 900 g/mol to about 3500 g/mol.

The present lignin derivatives may have any suitable polydispersity (D). For example, the D may be from about 1 to about 5; from about 1.2 to about 4; from about 1.3 to about 3.5; from about 1.4 to about 3.

The present lignin derivatives are preferably hydrophobic. Hydrophobicity may be assessed using contact angle measurements.

The present lignin derivatives may comprise alkoxy groups. For example, the present lignin derivatives may have an alkoxy content of 2 mmol/g or less; about 1.4 mmol/g or less; about 1.2 mmol/g or less; about 1 mmol/g or less; about 0.8 mmol/g or less; about 0.7 mmol/g or less; about 0.6 mmol/g or less; about 0.5 mmol/g or less; about 0.4 mmol/g or less; about 0.3 mmol/g or less. The present lignin derivatives may have an alkoxy content of 0.001 mmol/g or greater, about 0.01 mmol/g of greater, about 0.05 mmol/g or greater, about 0.1 mmol/g or greater.

The present lignin derivatives may comprise ethoxy groups. It has been found that derivatives of native lignin having an ethoxy content of 0.45 mmol/g or greater result in PF-resins having acceptable bond-strengths. For example, about 0.5 mmol/g or greater; about 0.6 mmol/g or greater; about 0.7 mmol/g or greater; about 0.8 mmol/g or greater; about 0.9 mmol/g or greater; about 1 mmol/g or greater; about 1.1 mmol/g or greater; about 1.2 mmol/g or greater. The present lignin derivatives may, for example, have an ethoxy content of about 3.75 mmol/g or less; 3.5 mmol/g or less; 3.25 mmol/g or less; 3 mmol/g or less; 2.75 mmol/g or less; 2.5 mmol/g or less; 2.25 mmol/g or less; 2 mmol/g or less; 1.9 mmol/g or less; 1.8 mmol/g or less; 1.7 mmol/g or less; 1.6 mmol/g or less; 1.5 mmol/g or less; 1.4 mmol/g or less; 1.3 mmol/g or less.

The present lignin derivatives may comprise other alkoxy groups apart from ethoxy groups such as $C_1$-$C_6$ alkoxy groups; $C_1$-$C_4$ alkoxy groups; $C_1$-$C_3$ alkoxy groups; methoxy and/or propoxy.

Quantification of the alkoxy groups can be performed using high resolution $^{13}C$ NMR spectroscopy. For example, quantification of ethoxyl groups can be performed by high resolution $^{13}C$ NMR spectroscopy. Identification of ethoxyl groups can be confirmed by 2D NMR HSQC spectroscopy. 2D NMR spectra may be recorded by a Bruker 700 MHz UltraShield Plus standard bore magnet spectrometer equipped with a sensitive cryogenically cooled 5 mm TCI gradient probe with inverse geometry. The acquisition parameters are the following: standard Bruker pulse program hsqcetgp, temperature of 298 K, a 90° pulse, 1.1 sec pulse delay (d1), and acquisition time of 60 msec.

Quantification of ethoxyl groups was performed using quantitative $^{13}C$ NMR spectroscopy. Identification of ethoxyl groups was confirmed by 2D NMR HSQC spectroscopy. 2D NMR spectra were recorded by a Bruker 700 MHz UltraShield Plus standard bore magnet spectrometer equipped with a sensitive cryogenically cooled 5 mm TCI gradient probe with inverse geometry. The acquisition parameters were as follow: standard Bruker pulse program hsqcetgp, temperature of 298 K, a 90° pulse, 1.1 sec pulse delay (d1), and acquisition time of 60 msec.

The derivatives of native lignin herein may be incorporated into resin compositions as epoxy resins, urea-formaldehyde resins, phenol-formaldehyde resins, polyimides, isocyanate resins, and the like. The lignin derivatives herein are particularly useful in phenolic resins.

Phenol-formaldehyde resins can be produced by reacting a molar excess of phenol with formaldehyde in the presence of an acid catalyst, such as sulfuric acid, hydrochloric acid or, oxalic acid (usually in an amount of 0.2 to 2% by weight based on the phenol) or a basic catalyst such as sodium hydroxide. To prepare the so-called "high ortho" novolac resins, the strong acid catalyst is typically replaced by a divalent metal oxide (e.g. MgO and ZnO) or an organic acid salt of a divalent metal (e.g. zinc acetate or magnesium acetate) catalyst system. The resins so-produced are thermoplastic, i.e., they are not self-crosslinkable. Such novolac resins are converted to cured resins by, for example, reacting them under heat with a crosslinking agent, such as hexamine (also called hexa or hexamethylenetetramine), or for example, by mixing them with a solid acid catalyst and paraformaldehyde and reacting them under heat. Novolac resins also may be cured with other cross linkers such as resoles and epoxies. The lignin derivative may be mixed with phenol at any suitable ratio. For example, a lignin:phenol weight ratio of about 1:10 to about 10:1, about 1:8 to about 8:1, about 1:6 to about 6:1, about 1:5 to about 5:1, about 1:4 to about 4:1, about 1:3 to about 3:1, about 1:2 to about 2:1, about 1:1. The lignin derivative may comprise any suitable amount of the total resin composition. For example, from about 1%, by weight, or greater, about 0.5% or greater, about 10% or greater, about 20% or greater, about 30% or greater, about 35% or greater, about 40% or greater, of the total resin composition. The lignin derivative may comprise from about 80%, by weight, or less, about 60% or less, about 50% or less, of the total resin composition. The resin compositions may comprise a variety of other optional ingredients such as adhesion promoters; biocides (e.g. bactericides, fungicides, and moldicides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; foaming agents; defoamers; hardeners; odorants; deodorants; antifouling agents; viscosity regulators; waxes; and combinations thereof.

The present disclosure provides binder compositions comprising any suitable amount of MDI and any suitable amount of lignin derivative. For example, the binder compositions may comprise about 0.1% to about 25%, about 1% to about 15%, about 3% to about 10%, of lignin derivative by weight of the total binder composition.

The present disclosure provides a method of incorporating derivatives of native lignin in compositions comprising MDI. In particular, the method comprises:
   a) providing a composition comprising derivatives of native lignin in a suitable solvent;
   b) providing a resin composition comprising MDI;
   c) mixing the compositions; and
   d) removing the solvent.

The present method provides for the modification of a MDI adhesive resin (usually a liquid) with an extracted lignin (usually a solid, dried before use) to form a relatively stable liquid MDI—lignin adhesive resin. The lignin may be dissolved in a suitable solvent such as acetone. The resulting solution may then be mixed with liquid MDI resins at a predetermined ratio. The solvent may then be extracted by, for example, vacuum distillation at low temperatures. During the distillation, MDI reacts with the lignin to form a relatively homogenous and stable MDI-lignin resin system. The solvent may be recovered and reused.

The present compositions may be incorporated into any suitable fibreboard or similar material. For example, low density fibreboard (LDF), medium density fibreboard (MDF), high density fibreboard (HDF), strawboard & other agricultural fibre/particle boards, oriented strand board (OSB), particle board, termite-resistant OSB made with a pMDI resin and borate compounds, termite-resistant MDF made with a pMDI resin and borate compounds, wood fibre insulation board (WFIB), polyurethane foams, and the like. The present compositions have be useful in foundry resins.

The present disclosure provides a method for producing a fibreboard comprising:
   a) providing fibres to a blowline;
   b) providing a binder comprising polymeric MDI and a derivative of native lignin;
   c) treating the fibres with the binder;
   d) preferably at least partially drying the treated fibres; and
   e) pressing the treated fibres to form a fibreboard.

Fibreboard is typically manufactured via a multi-step process. Wood chips, or other suitable materials, are fed into a digester where they are exposed to steam and/or high pressures in order to soften them. The treated material is then fed into a refiner where mechanical forces separate the component fibres. The fibres exit the refiner via a "blowline" where they are transported in steam. Typically, binders are added to the fibres in the blowline. The hot, moist conditions in the blowline are such that the isocyanates rapidly react with the water to form polyureas—that is, they "precure".

Typically the blowline deposits the treated fibres in a dryer, and then into pressing devices which produce the panels. Ideally, polymerization of the binder into its final thermoset form would take place in the press, not prior to pressing the fibreboard into its final form. However, because isocyanates are so reactive it is likely that a significant amount of isocyanate is converted to polyurea prior to pressing. This can lead to the formation of solids, which foul the blowline or the dryer. Also, pre-polymerization renders a significant portion of the binder inactive, reducing bonding efficiency. Furthermore, pre-cure can lead to structuring of the surface of the panel before pressing. This can lead to "crashing" of the surface during pressing and to a correspondingly lower performance characteristics such as MOR and MOE.

The preferred fibreboard products are manufactured from wood fibres, although other cellulosic fibres may also be used, including those manufactured from agricultural products.

The present disclosure provides a method of forming fibreboard, and particularly medium density fibreboard. Processes for production of medium density fibreboard are well known and a process is described, generally, below.

In producing medium density fibreboard, a polyisocyanate resin is applied directly to the hot and wet fibre material in the blowline out of the refiner of a fibreboard manufacturing plant. Generally, the material is first screened to remove oversized and undersized material, e.g., fines and dirt. The material may also be subjected to a washing step.

The material is conveyed to storage bins that feed pressurized digester-refiner systems. The refiners refine the raw material into fibre under steam pressure. The material passes from the steam-pressurized digester into the refining section while still under pressure, and this pressure is maintained during the refining. A digester is provided for pre-steaming of the raw material. Advantageously, molten wax is added to the material as they are fed to the digester. Generally, the material is steamed in the digester for about five to ten minutes at a pressure of about 550 kPa to 830 kPa.

As the material emerges from the digester, it passes through a refiner, which is also operated under steam pressure. The material is shredded into fibres in the refiner and then blown through an orifice (i.e., the blow-valve) out of the refiner into the "blowline". Typically, the steam pressure in the refiner can be from about 550 kPa to 1030 kPa, with temperatures ranging from about 140° C. to 205° C. The fibres which emerge from the refiner into the blowline generally have a moisture content of 50% or higher, by weight, based on the total solids weight, and a temperature of at least about 100° C. to 204° C. (usually above about 118° C.).

The present compositions may be introduced into the blowline to treat the hot fibre. For example the binder may be added to the material as it emerges from the refiner.

After refining, the material is conveyed through the blowline into a flash tube dryer, where the fibre moisture content is reduced to about 2% to 20%, by weight. Typically, the treated fibre is in an air stream tube dryer for about 30 seconds, during which time it is at a temperature of about 38° C. to 260° C.

After refining, treating with the binder, and drying, the fibre and air are separated via a separator air cyclone. Next, the fibre is transported to mechanical formers that uniformly lay down the fibre on to a moving 'forming line'.

The material can be treated in a pre-compressor to make it easier to handle. After pre-compression, the material is cut into desired lengths and fed into a conventional board-forming press, such as a typical medium density fibreboard press having multiple steam or oil heated platens, or a continuous press which consolidates the material between two opposing steel belts. The press consolidates and compresses the material to the desired thickness while the heat cures the binder composition. Typically, during the pressing operation the material is generally heated to a temperature of about 121° C. to 232° C. and compressed at about 690 kPa to 6900 kPa of pressure. Pressing times are typically about 2 to 10 minutes.

The compositions of the present disclosure may be added to the fibre material at any suitable quantity. For example, from about 0.5% to about 25%, from about 1% to about 15%, from about 2% to about 10%, from about 3% to about 8%, by weight based on the dry weight of the fibre material.

MDF produced according to the present disclosure has a good modulus of rupture (MOR) and modulus of elasticity (MOE) as well as an acceptable internal bond (TB) strength.

EXAMPLES

Example 1

MDI/Lignin Production

Two batches of 10 g of powdered lignin derivative are dissolved in two aliquots of 50 g of acetone to form 20% wt./wt. solutions. 100 g of MDI (Rubinate 1780) is then mixed into one solution and 200 g of MDI (Rubinate 1780) is mixed into the other. The solutions are then subjected to vacuum distillation at room temperature for 2 hours. This removes 95% of the acetone which can be stored and re-used. The two compositions are stored and their viscosities measured over a period of several days (Table 1). The results indicate that the mixtures are not entirely stable but are not so unstable as to be unusable.

TABLE 1

The viscosity and stability of the MDI-lignin resins

| | Viscosity (mPa · s) | |
|---|---|---|
| Storage time | 5% lignin mix | 10% lignin mix |
| 0 | 600 | 1600 |
| 24 h | 780 | 3600 |
| 6 days | 880 | 9300 |
| 10 days | — | 11250 |
| 17 days | 1350 | — |

In addition, 5 g and 10 g of hardwood lignin powder are directly mixed with 100 g of MDI resin (Rubinate 1780). The suspensions appear stable for at least 24 hours, but separation or precipitation occurs over an extended period of time.

A sample of the 5% MDI-lignin mixture manufactured using acetone, and one sample each from the 5% and 10% MDI-lignin compositions made via direct mixing, were used to manufacture a medium density fibreboard (MDF) using a standard blowline. The three resultant boards were measured for their shear strength (Table 2) according to the ABES method (Wescott, J. M., Birkeland, M. J., Traska, A. E., New Method for Rapid Testing of Bond Strength for Wood Adhesives, Heartland Resource Technologies Waunakee, Wis., U.S.A. and Frihart, C. R. and Dally, B. N., USDA Forest Service, Forest Products Laboratory, Madison, Wis., U.S.A., Proceedings 30$^{th}$ Annual Meeting of The Adhesion Society, Inc., Feb. 18-21, 2007, Tampa Bay, Fla., USA).

The resulting MDF panels were conditioned under ambient conditions for 7 days, and then tested for vertical density profile, average density, modulus of elasticity, modulus of rupture, internal bond strength, and thickness swell and water absorption after 24-hour water soak and compared to MDF made with MDI alone, and to the American National Standard Institute ANSI STD A208.2-2003 (Table 3).

TABLE 3

| Resin Type | Resin % | Press Temp (° F.) | Press Time (sec.) | D (lb/ft$_3$) | IB (psi) | IB/D | MOR (psi) | MOE (Mpsi) | WA (%) | TS (%) |
|---|---|---|---|---|---|---|---|---|---|---|
| MDI | 4.0 | 360 | 280 | 48.6 | 204.3 ± 24.3 | 4.20 | 5,135 ± 437 | 0.468 ± 0.023 | 24.5 ± 1.8 | 15.0 ± 1.6 |
| MDI-Lignin | 4.0 | 360 | 280 | 48.6 | 161.0 ± 23.5 | 3.31 | 5,731 ± 434 | 0.528 ± 0.038 | 24.7 ± 2.2 | 17.4 ± 0.9 |
| American ANSI STD A208.2 (2003) | N/A | N/A | N/A | N/A | 44-152 | N/A | 3,500 | 0.350 | N/A | N/A |

TABLE 2

Shear strength of the mixes (yellow birch veneer, thickness: 1.56 mm)

| Resin mix | Strength (MPa) | |
|---|---|---|
| | 150° C., 90 s | 200° C., 90 s |
| 5% lignin (acetone solution) mixed MDI | 3.3 (1.2) | 5.4 (0.7) |
| 5% lignin directly mixed with MDI | 4.0 (0.6) | 5.8 (0.8) |
| 10% lignin directly mixed with MDI | 4.3 (1.1) | 7.0 (1.9) |

Further MDI-bonded MDF panels were made at pilot scale. Wood fiber, which was dry and unresinated, was sourced from a Canadian MDF mill. In a fiberboard pilot plant, a weighted amount of the wood fiber was blended with a predetermined amount of pMDI resin or lignin-modified pMDI resin and a predetermined amount of emulsion wax in an air-suspension tube blender. Using the resulting resinated wood fiber, a homogenous fiber mat was constructed in a 710 mm×710 mm forming box with Teflon sheets on top and bottom of the mat, which was then hot pressed into a MDF panel by a Dieffenbacker press (864 mm×864 mm) equipped with a PressMan monitoring system.

Wood species: SPF
Fiber type: mechanically refined with a moisture content of about 8.5%
Control resin: RUBINATE 1780 (pMDI) at 4% add-on rate (dry wood basis)
Experimental resin: lignin—MDI containing 5% lignin at 4% add-on rate (dry wood basis)
Wax: emulsion wax (58% solids) at 0.5% add-on rate (dry wood basis)
Moisture content of blended fiber: 6.5%-7.5%
Target panel density: 768 kg/cu. m
Target panel thickness: 9.5 mm
Press temperature: 182 C (360 F)
Press time: 280 seconds
Pressing method: Press fast closed to 15% above target panel thickness and then slow closed to target thickness over 60 seconds, following by holding and degassing.

Example 2

Further testing was performed to compare OSB panel performance for a lignin-phenol-formaldehyde resin (LPF) and a commercial phenol-formaldehyde (PF) resin as adhesives for OSB face layers and to evaluate the feasibility of replacing commercial pMDI resin in OSB core layers with 30%, 40% and 50% LPF resins.

OSB Panel Manufacturing:

| | | Face | Core | |
|---|---|---|---|---|
| Group No. | Resin type | Resin solids add-on rate (%) | pMDI solids add-on rate (%) | Lignin-PF solids add-on rate (%) |
| 1 | Commercial PF | 3.00 | 2.00 | 0 |
| 2 | Lignin-PF | 3.00 | 2.00 | 0 |
| 3 | Commercial PF | 3.00 | 1.40 | 0.90 |
| 4 | Commercial PF | 3.00 | 1.20 | 1.20 |
| 5 | Commercial PF | 3.00 | 1.00 | 1.50 |

Wood species: Aspen
OSB strands: screened and dried to 2% moisture content.
Target mat moisture: 6%-7%
Face/core ratio: 50/50
Panel thickness: 7/16"
Panel dimension: 4'×8'×7/16"
Target density: 38 lb/ft$^3$
Face resin: PF or Ligin-PF at 3% solids add-on (warmed to 30° C. before blending)
Core resin: pMDI/lignin-PF (100:0, 70:30×1.5, 60:40×1.5 and 50:50×1.5)
E-wax: EW58S at 1% solids add-on (58% solids diluted with water to 50% solids)
Press temperature: 215° C.
Press cycle time: 155 seconds
Hot stacking: Yes
Replicates: 4 for each group
Total number of panels produced: 20

Panel Test Results:

|  | Group | | | | |
|---|---|---|---|---|---|
|  | 1 Commercial PF | 2 Lignin - PF | 3 Commercial PF | 4 Commercial PF | 5 Commercial PF |
| Surface Resin Loading | 3.00% | 3.00% | 3.00% | 3.00% | 3.00% |
| Core Resin Loading | pMDI - R1840 2.00% | pMDI - R1840 2.00% | Lignin* - PF pMDI - R1840 0.90% 1.40% | Lignin* - PF pMDI - R1840 1.20% 1.20% | Lignin* - PF pMDI - R1840 1.50% 1.00% |
| Density @ test point (10" × 10") | 39.0 | 39.3 | 39.3 | 39.2 | 39.4 |
| std | 1.28 | 1.28 | 2.04 | 1.44 | 2.67 |
| Thickness (inch) | 0.43 | 0.434 | 0.44 | 0.44 | 0.43 |
| std | 0.01 | 0.01 | 0.01 | 0.01 | 0.01 |
| Deflection (inch) | 0.38 | 0.394 | 0.38 | 0.37 | 0.38 |
| std | 0.03 | 0.02 | 0.03 | 0.03 | 0.04 |
| Ultimate Load (lbf) | 444 | 386 | 432 | 433 | 402 |
| std | 38.1 | 36.8 | 59.1 | 46.6 | 44.6 |
| fail/pass | 1/15 | 12/4 | 4/12 | 4/12 | 7/9 |
| APA PRP-108 Performance Criteria: | | (2001) | | | |
| Minimum Ultimate Load - | | 400 lbf | | | |
| Maximum Deflection @ 200 lbf | | 0.500 in | | | |

*HPL ™ lignin (available from Lignol Innovations, Burnaby, Canada, V5G 3L1)

The average density, vertical density profile, internal bond strength (IB), modulus of rupture (MOR), modulus of elasticity (MOE), and thickness swelling (TS) and water absorption (WA) was measured after 24-hour water soak.

| Group | MOR (parallel) (psi) | MOE (parallel) (Mpsi) | IB (psi) | IB/Core-density | Density (lb/ft$^3$) | TS (edge) (%) | WA (%) |
|---|---|---|---|---|---|---|---|
| 1 | 4320 | 0.861 | 37.4 | 0.52 | 37.7 | 26.0 | 49.2 |
| 2 | 3574 | 0.801 | 27.7 | 0.37 | 38.6 | 37.9 | 62.9 |
| 3 | 4164 | 0.878 | 35.7 | 0.48 | 38.7 | 27.7 | 48.9 |
| 4 | 4539 | 0.905 | 28.1 | 0.40 | 37.8 | 27.7 | 51.6 |
| 5 | 4276 | 0.908 | 25.3 | 0.36 | 39.3 | 28.8 | 54.5 |

The above results demonstrate that it is feasible to use LPF resin at 40% phenol replacement and that pMDI is an excellent cross-linker for LPF.

What is claimed is:

1. An adhesive system comprising:
   (a) a resin composition comprising a mixture of at least about 30% by weight of a phenol-formaldehyde resin and at least about 30% by weight of a derivative of native lignin; and
   (b) a liquid isocyanate-based binder, wherein the adhesive system does not have any other liquid solvent.

2. The system according to claim 1, wherein the system comprises at least about 35% by weight of the derivative of native lignin.

3. The system according to claim 1, wherein the derivative of the native lignin has an ethoxy content of 0.45 mmol/g or greater.

4. The system according to claim 1, wherein the isocyanate-based binder comprises methylene diphenyl diisocyanate.

5. The system according to claim 1, wherein the isocyanate-based binder comprises methylene diphenyl diisocyanate and a second derivative of native lignin.

6. The system according to claim 5, wherein the second derivative of native lignin of the isocyanate-based binder has an aliphatic hydroxyl content of from about 0.6 mmol/g to about 6.5 mmol/g.

7. A method of producing a fibreboard, the method comprising:
   (a) providing fibres to a blowline;
   (b) providing the adhesive system according to claim 1;
   (c) treating the fibres with the adhesive system;
   (d) pressing the treated fibres to form the fibreboard.

8. The method according to claim 7, wherein the treated fibres are at least partially dried prior to pressing the treated fibres to form the fibreboard.

9. The method according to claim 7, wherein the fibreboard is selected from the group consisting of a low density fibreboard, a medium density fibreboard, a high density fibreboard, a strawboard, and agricultural fibre/particle board, an oriented strand board, a particle board, a wood fibre insulation board, and a polyurethane board.

10. The system according to claim 1, wherein the derivative of native lignin has a phenolic hydroxyl content of from about 2 mmol/g to about 8 mmol/g.

11. The system according to claim 10, wherein the derivative of native lignin further has a polydispersity of from about 1 to about 5.

12. The system according to claim 1, wherein the derivative of native lignin further has a polydispersity of from about 1 to about 5.

13. The system according to claim 1, wherein the derivative of native lignin has an aliphatic hydroxyl content of from about 0.1 mmol/g to about 8 mmol/g.

14. The system according to claim 13, wherein the aliphatic hydroxyl content is from about 0.6 mmol/g to about 6.5 mmol/g.

15. The system according to claim 1, wherein the derivative of native lignin has an alkoxy content of from 0.001 mmol/g to 2 mmol/g.

* * * * *